United States Patent Office 3,690,920
Patented Sept. 12, 1972

---

3,690,920
LAMINABLE FILM HAVING AN INTEGRAL GLUTINOUS GROUND COATING
Pasco R. Santurri, 828 Clayton Road 63105, and John H. Rother, 6 Canterbury 63117, both of St. Louis, Mo.
No Drawing. Continuation-in-part of application Ser. No. 670,400, Sept. 25, 1967. This application June 3, 1970, Ser. No. 43,190
Int. Cl. B44d 1/10, 1/12, 1/14
U.S. Cl. 117—45                                     14 Claims

ABSTRACT OF THE DISCLOSURE

A polyvinylchloride film having a decorative imprint on one face thereof, and a ground coat provided on said decorative imprint to present a background therefor and having bonding properties, being laminable to a suitable rigid substrate preferably of cellulosic character such as plywood, hardboard, flakeboard, etc. The ground coat is normally nontacky permitting storing of the film in roll form pending usage, and comprising essentially pigmented resin emulsion, and a plasticizer providing an eutectic mixture adapted for softening within the range of 200–225° F. for bonding to the substrate in minimum nip time providing a minimum bond strength of 3 to 5 p.s.i. at 180° angle pull being applied to the film in a density of about 10 pounds for each 3000 square feet of film.

BACKGROUND OF THE INVENTION

This application is a continuation-in-part of application Ser. No. 670,400 filed Sept. 25, 1967, entitled Glutinous Ground Coating for Laminable Films, now abandoned.

This invention relates in general to laminable films and more particularly to a reverse printed film laminate integrally incorporating a ground coating which is adhesive in character.

Heretofore, various techniques have been performed in the industry for effecting a bonding between polyvinylchloride films and rigid substrates. It is understood that the films herein considered are clear, having on one face thereof decorative imprints, such as, particularly, simulated wood grainings, and with a ground or pad coat provided upon said face for forming a background therefor; such ground coats being opaque. It is recognized that, if desired, toning agents may be provided between the decorative imprint and the ground coat as required. In order to effect adhesion of the aforesaid films to rigid substrates such as plywood, particleboard and others, film manufacturers cause the films to be shipped to laminators often at relatively remote geographical areas who operate requisite equipment for effecting the lamination; and with the attendant need to reship the laminated material. The primary technique practiced for lamination is known as the rotary or continuous process, wherein, rotary laminating equipment with a hot "nip" roller is used on the unprinted surface of the vinyl film. The roller should be heated and capable of achieving a substantially 300° F. surface temperature. The particular adhesive used in such process may be a polyester resin in a solvent solution, and is applied to the surface of the selected substrate such as, for example, plywood. In some instances, the substrate may be preheated prior to application of the adhesive. Subsequent to the adhesive-coating action, the substrate is subjected to heating, as in an oven, to effect some evaporation of the solvent in order to render the glutinous material tacky. Then the substrate and the films are fed to the "nip" roller which, as stated, is at a surface temperature in the order of 200° to 300° F. and which, together with its cooperating back-up roller, will subject the laminable components to predetermined pressure thereby stably bonding the film to the substrate. The foregoing is merely illustrative of the general rotary method for it is to be observed that pressures, temperatures, and speeds must in each instance be determined by reason of the characteristics of the equipment available, as well as by the properties of the adhesive and of the laminates.

With rotary equipment, there are basically four laminating methods which may be practiced. One of these is wet bonding wherein the laminator applies the adhesive to either the polyvinyl chloride film or the substrate and the same are then laminated while the adhesive is in a wet state. This technique is utilized particularly with porous substrates. Another such method, referred to as wet fusion bonding, is similar to wet bonding but with the exception that heat is required to effect a fusing of the adhesive while the substrate is in contact with the film. This method has special application in laminating vinyl film to fabric.

A still further method, which is referred to as dry contact bonding, requires the laminator to apply the adhesive to both the film and the substrate and to cause a drying of the same prior to bonding which is accomplished under pressure. This method requires high bond strength and is adopted primarily wherein a non-porous substrate is utilized.

A fourth method, which is referred to as dry heat seal bonding necessitates the coating of the substrate with the adhesive and then the drying of the same, with the film being then bonded to the substrate under heat and pressure.

With the foregoing review of currently used procedures, it will be observed that in each instance, the laminators must undertake the application of the adhesive either to the film or to the substrate, or to both, depending upon the bonding method to be adopted. Accordingly, a laminator must, obviously, maintain substantial inventories of a variety of adhesives to meet the specifications of each bonding situation, as well as to maintain costly ovens for preheating of the substrates where indicated, to drive off portions of the solvent to render the adhesive tacky. Additionally, laminators must make substantial investment in spreaders, and the like, and drying tunnels. Furthermore, the various solvents used for the adhesives normally require careful handling and storing in view of the fact that the same constitute a constant fire hazard.

Thus, to the present time the lamination process has been relatively costly as such requires specialized equipment for applying the adhesive only at the time of lamination. It has been unknown to pretreat the film with a suitable adhesive so that the same may be stored for indefinite periods with the film being adapted for activation whenever lamination is desired.

SUMMARY OF THE INVENTION

It is therefore an object of the present invention to provide a polyvinyl chloride film suitably printed for the intended decorative purpose and integrally having a ground coat possessing adhesive characteristics for direct bonding to a substrate, thereby obviating the necessity of a laminator undertaking the independent application of glutinous material to either the film or the substrate before bonding.

It is another object of the present invention to provide a film of the type stated having a ground or pad coat which simultaneously provides a base for the decorative imprint and a heat-sealable agent which is normally nontacky to allow for direct lamination of the film and of the desired substrate.

It is a still further object of the present invention to provide a polyvinyl chloride film integrally incorporating a glutinous ground coat for direct adhesion to a substrate whereby substantial savings in the laminating procedure are effected since coating and heating equipment heretofore required by a laminator are obviated, as well as extensive inventories of adhesives and compatible solvents.

It is another object of the present invention to provide a method for effecting a rapid and reliable bond between polyvinyl chloride film and a rigid substrate which method is designed for practice at substantial economics over presently known laminating procedures.

DESCRIPTION OF THE PREFERRED EMBODIMENT

In accordance with the present invention there is provided the well-known rigid clear polyvinyl chloride films which are preferably presented in continuous or roll form so that the same, after the treatment hereinbelow described, may be laminated to a rigid substrate by the rotary or continuous technique. There is applied, as by a suitable reproductive process, as for instance, grainings simulating wood grain. Such decorative coating is provided in accordance with conventional techniques and does not form a part of the present invention. Applied upon the decorative coating is a ground or pad coat which comprises essentially a resin film derived from a resin emulsion and a plasticizer; such ground coat being opaque and presenting a background for the components of the decorative coating to co-act with the same to provide a finished appearance, visible through the film; the untreated surface of which will constitute, in usage, an outer protective layer.

The resins in the ground coat of the present invention are water emulsions, being colloidal dispersions and possess certain critical physical properties to render same effective for the intended purpose since the emulsions have a dual capacity, one being to present the requisite base for the decorative coating, as aforesaid, and another to constitute a laminable medium to render the ground coating bondable to the particular substrate. Accordingly, emulsions discovered adequate must be those having a molecular affinity for polyvinyl chloride surfaces and must be either anionic or non-ionic, as cationic emulsions are unsuitable. Furthermore, the heat-sealing capabilities of such ground coat must be such as to cause the effecting of a seal at temperatures within the range of 150° to 300° F., to thereby allow bonding to be brought about by presently available equipment. As such resin emulsions must be pigmented in order to present a compatible background for the decorative coating, it is necessary that the same be in a dry or non-tacky form when pigmented. Extensive investigation has further revealed that such ground coatings must be substantially basic having a pH range of about 6.5 to 10.

Particular polymeric resins within an aqueous dispersion or emulsion which have been discovered to have the requisite properties for development of the ground coat used in accordance with the present invention are emulsions of polyvinylchloride, polyvinylchloride/acrylic copolymer, polyvinylacetate, and acrylic copolymer.

Thus, generally, to constitute a ground coat in accordance with this invention, there is to be provided essentially the particular polymeric resin within a dispersed medium, as water, which emulsion is in the order of approximately 50% solids together with a pigment and a plasticizer, which latter includes waxes. The ratio of the resin emulsion to the pigment is substantially in the order of about 5 or 6 to 1. The pigments in addition to providing the desired coloration of the background for the particular decorative coating, also serves to prevent sticking or blocking when the film, with the ground coat applied thereon, is in roll form, that is, as stored against subsequent usage. Pigments suitable for the present invention comprehend carbon black, clay, copper phthalocyanine, titanium dioxide, zinc sulfide, iron oxide, molybdate orange, calcium carbonate, and the like as well as combinations of the same. The plasticizers to be incorporated in the ground coating may be of liquid or solid character, including certain various waxes, which serve to provide a eutectic mixture which softens sharply within the range of approximately 200–225° F. for bonding the film to the substrate in a "nip" time of approximately .04 to .25 second. The bond provided is of the strength within the range of 3 to 5 pounds per square inch of pull at an angle of 180° and a pull rate of 12 inches per minute. Liquid plasticizers especially useful in the present invention are salts of phthalic acid, such as dioctylphthalate, diphenylphthalate, and dicyclophenylphthalate. Other plasticizers are tolylsulfonamides and exemplary of the solids or waxes are various salts of stearic acid, such as zinc stearate, magnesium stearate, and aluminum stearate. Combinations of said plasticizers may also be used. None of these plasticers adversely affect the adhesive or bonding properties of the resin emulsions.

With the novel preparation of the present invention the addition of the pigment in the amount requisite does not alter the bonding temperature.

Thus, a general formulation for the ground coating would be as follows; the same being based upon dry weight, after evaporation of the dispersing medium:

| Material: | Percent by weight, approx. |
| --- | --- |
| Resin (emulsion) | 75–85 |
| Pigment | 15–20 |
| Plasticizer | 1–5 |

Example I

A ground coat having the properties of the present invention may be made in accordance with the following formulation:

| Material: | Parts by weight, grams (dry) |
| --- | --- |
| Polyvinylacetate | 1800 |
| Titanium dioxide | 300 |
| Dioctylphthalate | 90 |

With respect to the foregoing it will be seen that the titanium dioxide will provide a white pigment so as to color such a background for the particular descriptive coating.

The aforesaid components of the ground coat are mixed or blended under room conditions of temperature and atmosphere so tnat there are not involved any procedural problems in constituting the aforesaid ground coat.

After producing the pigmented resin emulsion or ground coat, the same is then applied to the decorated side of the polyvinylchloride film as by any well-known conventional means such as roll coating, wire coating, by an air-knife, etc.; such application also being conducted under room conditions. The aqueous phase is then removed from the composition by evaporation, with sucn being accelerated by subjection to drying, as by hot air such as within a temperature range of 115° to 130° F. which will leave the ground coat in a condition which is non-tacky to the touch. The polyvinylchloride film with its applied ground coat is then stored in roll form for tne ultimate lamination of the same to a substrate.

The polyvinylchloride film as thus treated now contains a ground coat which is suitable as a background for a decorative coat as well as to render the film laminable. When it is desired to laminate the film to the selected substrate, the film is suitably fed from the storage roll to the "nip" roller for heating to within the range of 200 to 225° F. for rendering said film tacky to allow for proper bonding to the substrate. It is thus apparent that by use of the present invention there is obviated the heretofore, accepted costly procedures of independently applying adhesives to films with the requisite use of spreaders, drying tunnels and the like as well as eliminating the need for potentially hazardous organic solvents. Yet during storage periods the film is non-tacky under room and atmospheric conditions and thus is stable during indefinite storage periods.

Example II

Another example of a formulation for a ground coat which may be made in accordance with the present invention is the following:

| Material: | Parts by weight, grams (dry) |
|---|---|
| Polyvinylchloride/acrylic (emulsion) | 1800 |
| Titanium dioxide | 300 |
| Dicyclohexylphthalate | 50 |
| Zinc stearate | 30 |

With this particular formulation, the plasticizer is a combination of a liquid and a wax and is thus exemplary of a ground coat embodying such a typical combination.

Example III

Another formulation in accordance with this invention is as follows:

| Material: | Parts by weight, grams (dry) |
|---|---|
| Polyvinylacetate (emulsion) | 1800 |
| Clay | 40 |
| Titanium dioxide | 275 |
| Tolyl sulfonamide | 90 |

With this formulation, the pigment is a combination of clay and titanium dioxide. It is to be recognized that such pigment combinations produce desired coloration or shading.

Example IV

| Material: | Parts by weight, grams (dry) |
|---|---|
| Polyvinylacetate (emulsion) | 1800 |
| Diphenylphthalate | 90 |
| Molybdate orange | 75 |
| Titanium dioxide | 150 |
| Calcium carbonate | 50 |

Example V

| Material: | Parts by weight, grams (dry) |
|---|---|
| Acrylic (emulsion) | 1800 |
| Dioctylphthalate | 50 |
| Iron oxide | 150 |
| Clay | 100 |
| Titanium dioxide | 50 |

The above formulation of Examples IV and V indicates that the ground coat of the present invention may effectively comprise a pigment formed of three compounds.

Example VI

| Material: | Parts by weight, grams (dry) |
|---|---|
| Polyvinylacetate (emulsion) | 1800 |
| Copper phthalocyanine | 200 |
| Clay | 100 |
| Dioctylphthalate | 36 |

Example VII

| Material: | Parts by weight, grams (dry) |
|---|---|
| Polyvinylchloride/acrylic copolymer (emulsion) | 900 |
| Aluminum stearate | 300 |
| Carbon black | 100 |
| Clay | 200 |

Example VIII

| Material: | Parts by weight, grams (dry) |
|---|---|
| Polyvinylacetate (emulsion) | 1800 |
| Zinc stearate | 18 |
| Titanium dioxide | 280 |
| Clay | 30 |

Example IX

| Material: | Parts by weight, grams (dry) |
|---|---|
| Acrylic (emulsion) | 1800 |
| Zinc sulfide | 300 |
| Magnesium stearate | 18 |

The foregoing thus are but exemplary of ground coat formulations which contain the unusual properties and characteristics of the present invention. It is to be understood that all such ground coats may be prepared under room and atmospheric conditions and with simple mixing equipment so that costly machinery and highly skilled personnel are not needed to prepare same.

Ground coats are normally applied to the polyvinylchloride film in a density within the range of 10 to 15 pounds for each 3,000 square feet of film. As indicated above, the polyvinylchloride films having ground coats constituted as exemplified hereinabove are subjected to a relatively simple bonding process. The laminator without having to, in any way, preheat the particular substrate, whether the same be plywood, hardboard, flakeboard, and the like, feeds the said film and substrate to the "nip" rolls which have a surface temperature of approximately 200° to 300° F. The heat thereby provided will activate the adhesive characteristics of the ground coat so as to effect a reliable bond to the substrate having peel strengths corresponding to bonds developed by more costly and time-consuming procedures heretofore known. Thus, by utilization of films embodying the present invention, the lamination process may be most rapidly and efficiently performed with attendant marked economies over the costly processes heretofore known. The ground coat of this invention thus embodies the adhesive and obviates the necessity for the laminator to undertake the step of applying bonding material before presenting the film to the substrate.

It should be understood that changes and modifications in the formation, construction, arrangement, and combination of the parts of the ground coat of the present invention may be made and substitutions for those herein shown and disclosed without departing from the nature and principle of our invention.

It should be further understood that the examples hereinabove set forth are for the purpose of illustrating compositions formed in accordance with the present invention. However, as indicated by the fundamental or generic formulation hereinabove set forth the principal ingredients, namely the polymeric resins, plasticizer and pigment may be varied within the ranges specified and within the combinations indicated. Consequently, the aforesaid specific examples are not to be interpreted as limiting by reason of relatively precise proportions recited.

Having thus described our invention, what we claim and desire to obtain Letters Patent for is:

1. A film for lamination with a rigid cellulosic substrate comprising a continuous polyvinylchloride film body, a decorative coating provided on one face of said film, an adhesive ground coat applied on said decorative coating, said ground coat being opaque to provide a background for said decorative coating and consisting essentially of a composition formed of a polymeric resinous base transitorily emulsified for effecting intermixture, and having a molecular affinity for a polyvinylchloride film body and a pH in the range of about 6.5 to 10, said polymeric resinous base comprising 75 to 85% by weight of the ground coat, at least one plasticizer, comprising 1 to 5% by weight of the ground coat, and at least one pigment, comprising 15 to 20% by weight of the ground coat, said composition being heat sealable with the range of 150°–300° F., within .04 to .25 second, said ground coat composition also having a density of approximately 10 pounds for each 3000 square feet of the film body and being non-tacky under atmospheric conditions for permitting rolling of said film for storage and also having a pull strength of within the range of 3 to 5 pounds per square inch at a 180° angle of pull.

2. A film for lamination with a rigid substrate as defined in claim 1 and further characterized by said polymeric resinous base being in the class consisting of polyvinylchlorides, polyvinylchloride/acrylic copolymer, polyvinylacetates, and acrylic copolymers.

3. A film for lamination with a rigid substrate as defined in claim 1 and further characterized by said pigment being from the class consisting of titanium dioxide, iron oxide, zinc sulfide, copper phthalocyanine, clay, molybdate orange, calcium carbonate, and combinations thereof.

4. A film for lamination with a rigid substrate as defined in claim 1 and further characterized by said polymeric resinous base being from the class consisting of polyvinylchlorides, polyvinylchloride/acrylic copolymers, polyvinylacetates, and acrylic copolymers; said pigment being from the class consisting of titanium dioxide, iron oxide, zinc sulfide, copper phthalocyanine, clay, molybdate orange, calcium carbonate, and combinations thereof; and a plasticizer from the class consisting of dioctylphthalate, zinc stearate, tolyl sulfonamide, diphenylphthalate, aluminum stearate, magnesium stearate, and combinations thereof.

5. A film for lamination with a rigid substrate as defined in claim 1 and further characterized by said polymeric resinous base being polyvinylacetate, said plasticizer being dioctylphthalate and said pigment being titanium dioxide.

6. A film for lamination with a rigid substrate as defined in claim 1 and further characterized by said polymeric resinous base being acrylic, said plasticizer being dioctylphthalate, and said pigment consisting of iron oxide, clay and titanium dioxide.

7. A film for lamination with a rigid substrate as defined in claim 1 and further characterized by said polymeric resinous base being polyvinylacetate, said plasticizer being dioctylphthalate, and said pigment being clay and copper phthalocyanine.

8. A film for lamination with a rigid substrate as defined in claim 1 and further characterized by said polymeric resinous base being polyvinylchloride/acrylic copolymer; said plasticizer being aluminum stearate; and said pigment comprising carbon black and clay.

9. A film for lamination with a rigid substrate as defined in claim 1 and further characterized by said polymeric resinous base being polyvinylacetate; said plasticizer being zinc stearate; and said pigment comprising clay and titanium dioxide.

10. A film for lamination with a rigid substrate as defined in claim 1 and further characterized by said polymeric resinous base being acrylic, said plasticizer being magnesium stearate, and said pigment being zinc sulfide.

11. A film for lamination with a rigid substrate as defined in claim 1 and further characterized by said polymeric resinous base being polyvinylacetate, said plasticizer being diphenylphthalate, and said pigment comprising molybdate orange, titanium dioxide, and calcium carbonate.

12. A film for lamination with a rigid substrate as defined in claim 1 and further characterized by said polymeric resinous base being polyvinylacetate, said plasticizer being toly sulfonamide, and said pigment comprising clay and titanigum dioxide.

13. A film for lamination with a rigid substrate as defined in claim 1 and further characterized by said polymeric resinous base being polyvinylchloride/acrylic, said plasticizer comprising dicyclohexylphthalate and zinc stearate, and said pigment being titanium dioxide.

14. A film for lamination with a rigid cellulosic substrate comprising a continuous polyvinylchloride film body, a decorative coating provided on one face of said film, a ground coat applied on said decorative coating, said ground coat being opaque to provide a background for said decorative coating and consisting essentially of a composition formed of a polymeric resinous base transitorily emulsified for effecting intermixture, said polymeric resinous base being in the class consisting of polyvinylchlorides, polyvinylchloride/acrylic copolymers, polyvinylacetates, acrylic copolymers, said polymeric resinous base constituting 75 to 85% by weight of the ground coat, at least one plasticizer from the class consisting of dioctylphthalate, zinc stearate, tolyl sulfonamide, diphenylphthalate, aluminum stearate, magnesium stearate, and combinations thereof, said plasticizer constituting 1 to 5% by weight of the ground coat, and at least one pigment from the class consisting of titanium dioxide, iron oxide, zinc sulfide, copper phthalocyanine, clay, molybdate orange, calcium carbonate, and combinations thereof, said pigment constituting 15 to 20% by weight of the ground coat.

References Cited

UNITED STATES PATENTS

| | | | |
|---|---|---|---|
| 2,569,954 | 10/1951 | Ruebensaal | 117—122 H |
| 2,853,404 | 9/1958 | Weinberg | 117—122 H |
| 3,353,992 | 11/1967 | Grenley et al. | 117—122 H |
| 3,078,182 | 2/1963 | Crone, Jr. et al. | 117—161 UF X |
| 3,240,742 | 3/1966 | Hahn et al. | 117—161 UF X |
| 3,014,501 | 12/1961 | Jacobi | 117—122 H |
| 3,451,837 | 6/1969 | Mork | 117—45 X |
| 3,312,563 | 4/1967 | Rusch | 117—45 X |
| 3,158,494 | 11/1964 | Eikvar et al. | 117—45 |
| 3,399,165 | 8/1968 | Berger et al. | 117—122 H X |
| 2,748,027 | 5/1956 | Meier | 117—161 UH X |

OTHER REFERENCES

Modern Plastics Encyclopedia Issue For 1962, vol 39, No. 1A, Breskin Publications, Bristol, Conn., September 1961, p. 475.

The Condensed Chemical Dictionary, 7th ed., Reinhold Publishing Corp., New York, September 1966, pp. 42, 577, 953, 1037.

ALFRED L. LEAVITT, Primary Examiner

K. P. GLYNN, Assistant Examiner

U.S. Cl. X.R.

117—122 H, 161 UF, 161 UH

PO-1050
(5/69)

UNITED STATES PATENT OFFICE
CERTIFICATE OF CORRECTION

Patent No. 3,690,920           Dated September 12, 1972

Inventor(s) Pasco R. Santurri and John H. Rother

It is certified that error appears in the above-identified patent and that said Letters Patent are hereby corrected as shown below:

Column 1, Line 6, after "Mo." insert

---Assignors to The Orchard Corporation of America, St. Louis, Missouri 63126---.

Signed and sealed this 3rd day of April 1973.

(SEAL)
Attest:

EDWARD M. FLETCHER, JR.           ROBERT GOTTSCHALK
Attesting Officer           Commissioner of Patents